(12) United States Patent
Hirota et al.

(10) Patent No.: US 12,515,584 B2
(45) Date of Patent: Jan. 6, 2026

(54) STEERING DEVICE PAD

(71) Applicant: TOYODA GOSEI CO., LTD., Kiyosu (JP)

(72) Inventors: Itsuhiko Hirota, Kiyosu (JP); Kenji Fujimura, Kiyosu (JP); Masaaki Mori, Kiyosu (JP); Akitoshi Naganawa, Kiyosu (JP); Kazuma Muramatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/063,035

(22) Filed: Feb. 25, 2025

(65) Prior Publication Data
US 2025/0303959 A1 Oct. 2, 2025

(30) Foreign Application Priority Data
Mar. 28, 2024 (JP) .................... 2024-054001

(51) Int. Cl.
| | | |
|---|---|---|
| B60Q 3/283 | (2017.01) | |
| B60Q 3/64 | (2017.01) | |
| B60R 13/00 | (2006.01) | |
| B60R 21/203 | (2006.01) | |
| B60R 21/215 | (2011.01) | |
| B60R 21/2165 | (2011.01) | |

(Continued)

(52) U.S. Cl.
CPC ............... *B60Q 3/283* (2017.02); *B60Q 3/64* (2017.02); *B60R 13/005* (2013.01); *B60R 21/203* (2013.01); *B60R 21/215* (2013.01); *B60R 21/21656* (2013.01); *G09F 13/08* (2013.01); *G09F 13/10* (2013.01); *B60K 2360/27* (2024.01); *B60K 2360/336* (2024.01); *B60K 2360/34* (2024.01); *B60R 2021/21543* (2013.01)

(58) Field of Classification Search
CPC . B60Q 3/283; B60Q 3/62; B60Q 3/64; B60Q 3/66; B60R 21/203; B60R 21/215; B60R 21/21656; B60R 21/2165; B60R 13/005; B60R 2021/21543; B60K 2360/27; B60K 2360/28; B60K 2360/33; B60K 2360/34; B60K 2360/336; B62D 1/04; B62D 1/10; G09F 13/08; G09F 13/10
USPC ............................. 280/731, 728.3; 362/488
See application file for complete search history.

(56) References Cited

U.S. PATENT DOCUMENTS

| | | | |
|---|---|---|---|
| 10,507,764 B2 | 12/2019 | Schneider et al. | |
| 12,240,327 B2 * | 3/2025 | Kring | B60K 35/25 |
| 12,304,312 B2 * | 5/2025 | Masatsugu | B60Q 3/10 |

(Continued)

FOREIGN PATENT DOCUMENTS

| | | | | |
|---|---|---|---|---|
| DE | 102008057332 A1 * | 5/2010 | ......... | B60R 13/0206 |
| JP | 2008-238879 A | 10/2008 | | |

*Primary Examiner* — Keith J Frisby
(74) *Attorney, Agent, or Firm* — Posz Law Group, PLC

(57) ABSTRACT

A steering device pad is disposed on an upper face of a boss portion in a steering device, and a design portion is disposed in a region of a ceiling wall portion covering the boss portion. The steering device pad includes a pad body and a light source unit disposed on a back face of a ceiling wall portion of the pad body. The ceiling wall portion includes a low translucent portion and a high translucent portion having different light transmittances. The high translucent portion constitutes the design portion so as to be configured to transmit light emitted from the light source unit.

7 Claims, 9 Drawing Sheets

(51) Int. Cl.
*G09F 13/08* (2006.01)
*G09F 13/10* (2006.01)

(56) References Cited

U.S. PATENT DOCUMENTS

| | | | |
|---|---|---|---|
| 2009/0080076 A1* | 3/2009 | Fujikura | G02B 5/02 |
| | | | 359/585 |
| 2020/0198535 A1* | 6/2020 | Kontani | B60K 35/21 |
| 2021/0284063 A1* | 9/2021 | Wang | F21V 9/40 |
| 2023/0311804 A1* | 10/2023 | Glynn | B60R 21/21658 |
| 2024/0217470 A1* | 7/2024 | Liu | B60Q 1/0082 |

* cited by examiner

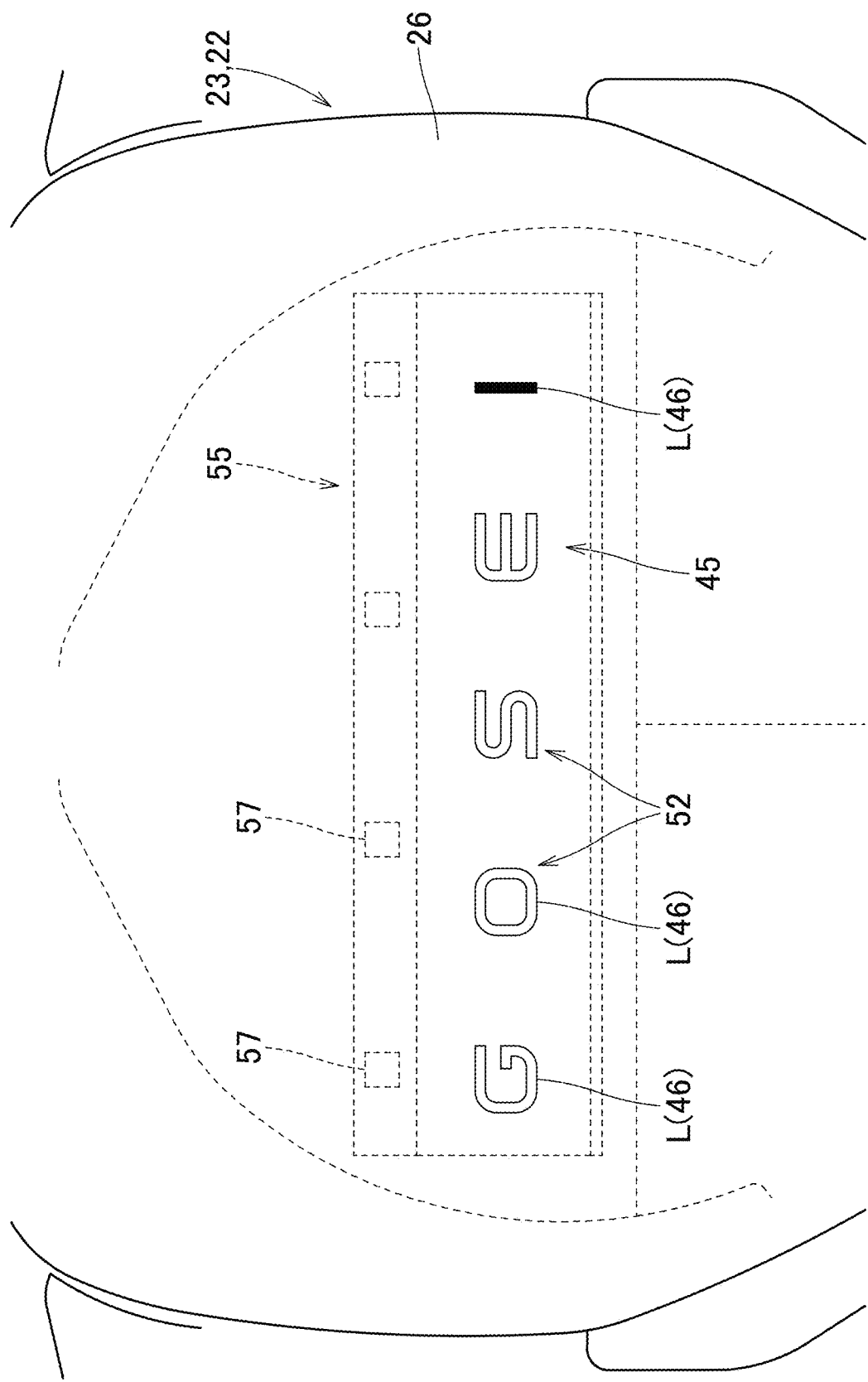

STEERING DEVICE PAD

CROSS REFERENCE TO RERATED APPLICATION

The present application claims priority from Japanese Patent Application No. 2024-054001 of Hirota et al., filed on Mar. 28, 2024, the entire disclosures of which are incorporated herein by reference.

BACKGROUND

1. Technical Field

The present disclosure relates to a steering device pad that is disposed on an upper face of a boss portion in a steering device and in which a design portion is disposed in a region of a ceiling wall portion covering the boss portion.

2. Description of Related Art

In the related art, as a pad for a steering device (steering wheel), as disclosed in JP 2008-238879 A, there has been a pad having a configuration in which a decorative body as a design portion is provided in a region of a ceiling wall portion and the decorative body can shine.

However, in the conventional pad, a decorative body separate from the pad is attached to the ceiling wall portion, and a light source for illuminating the decorative body is also disposed. Therefore, the conventional pad has a large number of parts, and there is room for improvement in weight reduction, reduction in the number of manufacturing steps and cost, and the like.

SUMMARY

A steering device pad of the present disclosure is a steering device pad that is disposed on an upper face of a boss portion in a steering device and in which a design portion is disposed in a region of a ceiling wall portion covering the boss portion,
wherein
the steering device pad includes
a pad body, and
a light source unit disposed on a back face of the ceiling wall portion of the pad body and configured to irradiate the design portion, wherein
the ceiling wall portion includes a low translucent portion and a high translucent portion having different light transmittances, and wherein
the high translucent portion constitutes the design portion so as to be configured to transmit light emitted from the light source unit.

BRIEF DESCRIPTION OF THE DRAWINGS

FIG. 9 is a partially enlarged plan view illustrating a lighting state of a visible light LED in the steering wheel according to the embodiment.

DESCRIPTION OF THE PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
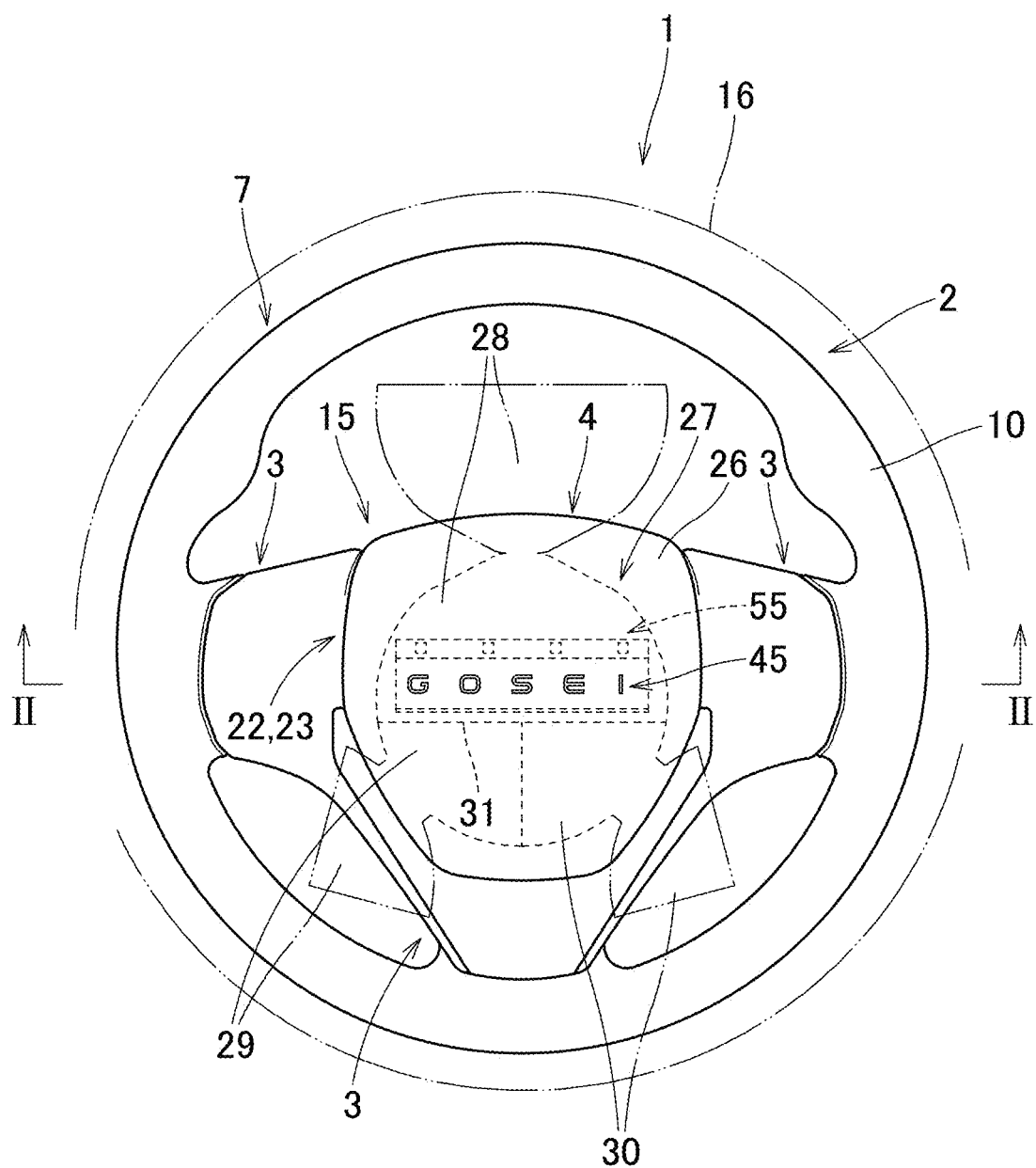
FIG. 1 is a plan view of a steering wheel (steering device) using a pad according to an embodiment of the present disclosure.
Figure 2:
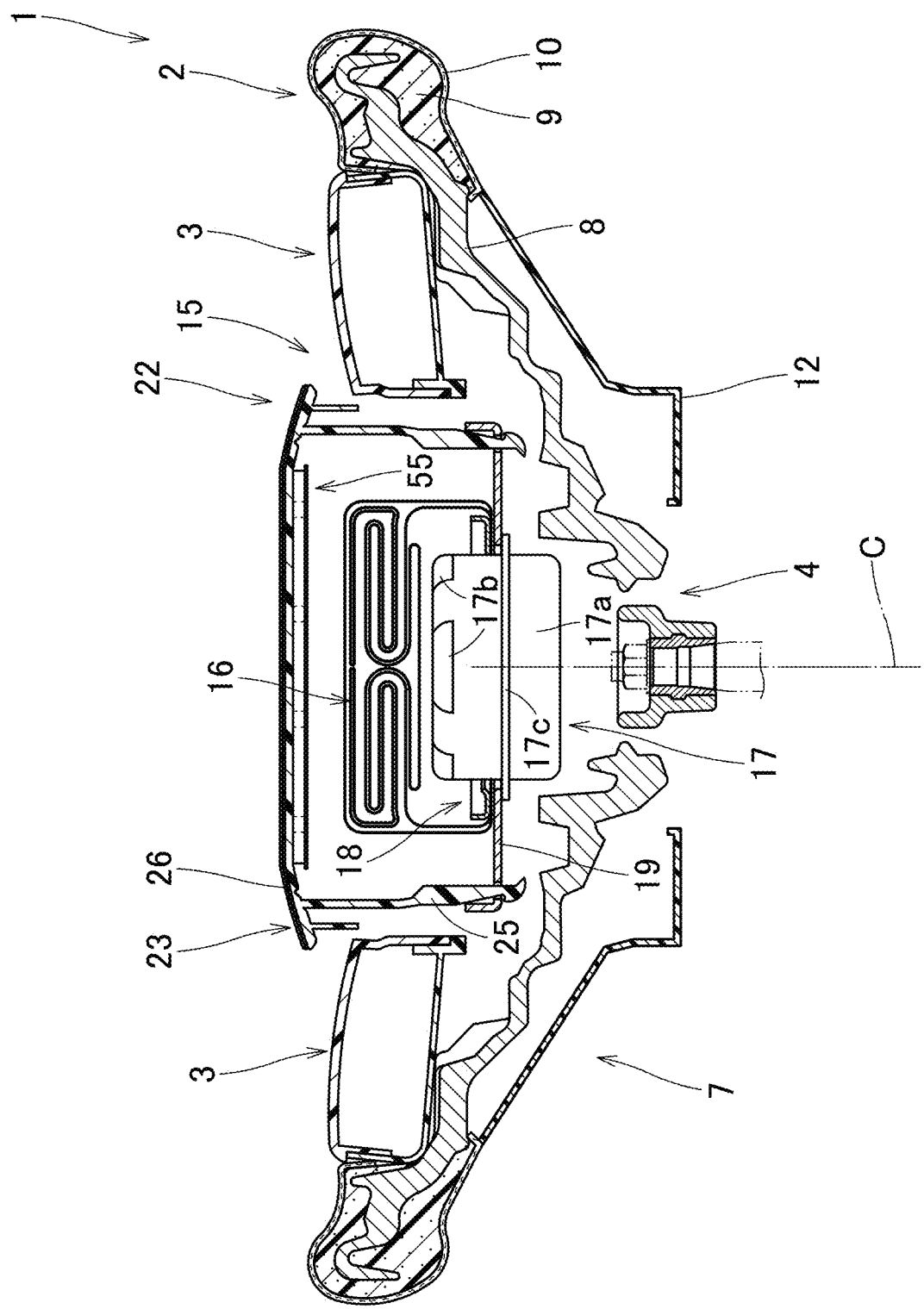
FIG. 2 is a schematic cross-sectional view of the steering wheel according to the embodiment, and illustrates a portion taken along line II-II in FIG. 1.

Hereinafter, an embodiment of the present disclosure will be described with reference to the drawings. A steering device pad (hereinafter, it is simply referred to as a "pad") 22 of the embodiment is used for a steering device (steering wheel) 1 as illustrated in FIGS. 1 to 4. In the case of the embodiment, as illustrated in FIG. 1, the steering wheel 1 as a steering device includes an annular ring portion 2 gripped at the time of rotational steering, a boss portion 4 disposed at the center of the ring portion 2, and a plurality of (3 in the case of the embodiment) spoke portions 3 connecting the ring portion 2 and the boss portion 4. As illustrated in FIGS. 1 and 2, the steering wheel 1 includes a steering wheel body (steering device body) 7 and an airbag device 15 disposed at the upper part of the boss portion 4 as components.

In the present specification, the front-rear, up-down, and left-right directions will be described based on the straight advancing steering state of the steering wheel 1 mounted on the vehicle unless otherwise specified. Specifically, a direction along the rotation center axis C (see FIG. 2) of the ring portion 2 is defined as an up-down direction, a direction orthogonal to the rotation center axis C of the ring portion 2 and along the front-rear direction of the vehicle is defined as a front-rear direction, and a direction orthogonal to the rotation center axis C of the ring portion 2 and along the left-right direction of the vehicle is defined as a left-right direction.

Figure 4:
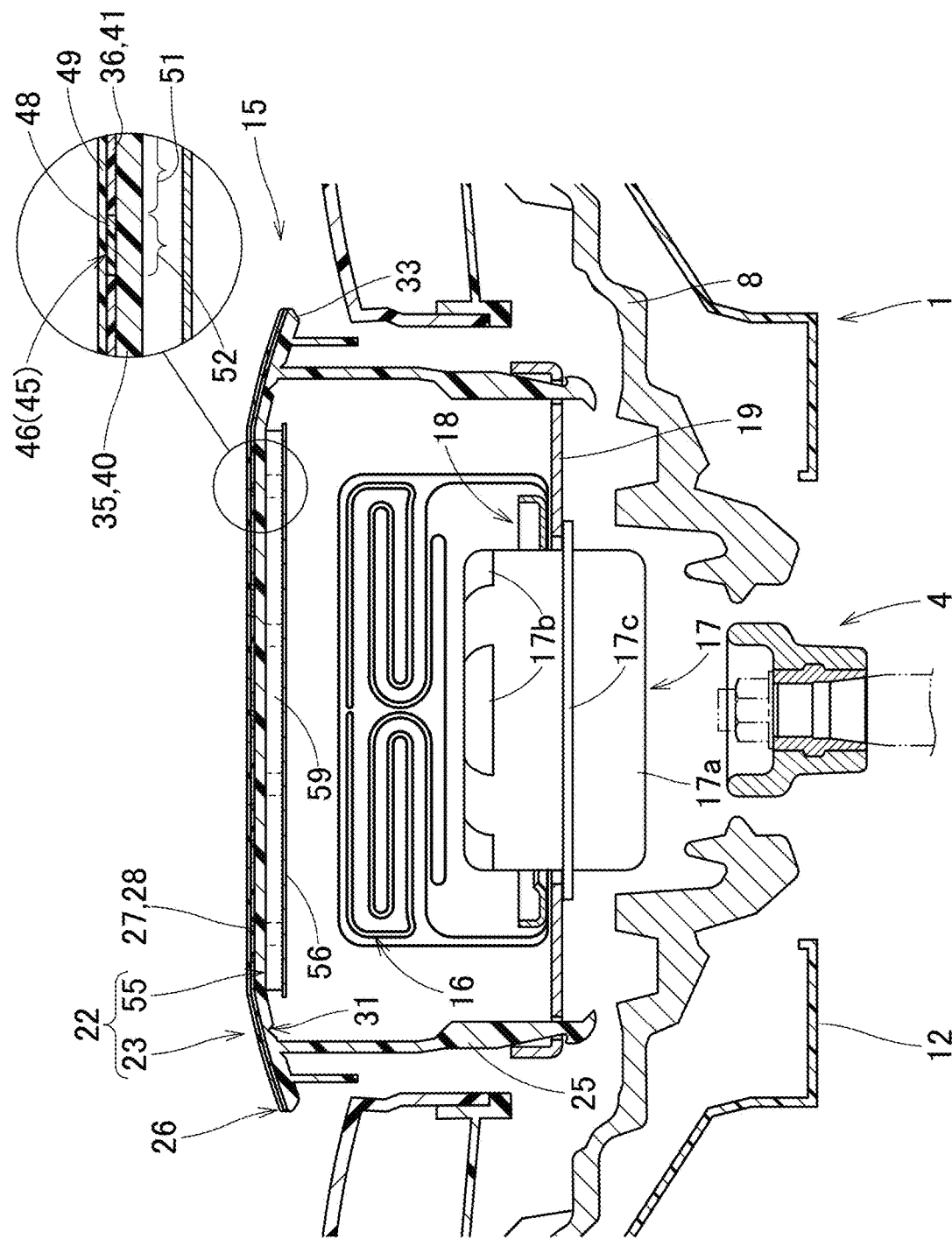
FIG. 4 is a partially enlarged cross-sectional view illustrating a region near a pad in the steering wheel according to the embodiment.

As illustrated in FIGS. 2 and 4, the steering wheel body 7 includes a core metal 8 disposed so as to connect the ring portion 2, the boss portion 4, and the spoke portion 3 to each other; a covering layer 9 covering a periphery of the core metal 8 in the ring portion 2 and the spoke portion 3; a skin layer 10 covering an outer periphery of the covering layer 9; and a lower cover 12 that covers a lower face of the boss portion 4. The core metal 8 is made of metal including an aluminum alloy or the like. The covering layer 9 is made of a soft foam material such as foamed polyurethane. The skin layer 10 is made of a synthetic resin sheet body or leather such as natural leather, synthetic leather, or artificial leather. The lower cover 12 is made of synthetic resin.

As illustrated in FIGS. 2 and 4, the airbag device 15 includes an airbag 16 that is folded and stored; an inflator 17 that supplies an inflation gas to the airbag 16; a pad 22 disposed on an upper face of the boss portion 4 and covering the folded airbag 16; a bag holder 19 that holds the airbag 16, the inflator 17, and the pad 22; and a retainer 18 for attaching the airbag 16 and the inflator 17 to the bag holder 19.

The airbag 16 has a bag shape made of a flexible sheet body. Although not illustrated in detail, the airbag 16 has a disk shape that can cover the entire upper face of the ring portion 2 in the inflation-completed shape in which the inflation gas flows into the airbag.

The inflator 17 includes a cylindrical main body 17a provided with a plurality of gas discharge ports 17b for discharging an inflation gas in an upper portion, and a flange 17c protruding from an outer peripheral face of the main body 17a.

The retainer 18 is made of a square annular sheet metal. Bolts (not illustrated) are protruded downward at four corners of the retainer 18. The retainer 18 is disposed in the airbag 16, and the airbag 16 and the inflator 17 are attached to the bag holder 19 by causing bolts (not illustrated) to sequentially pass through the airbag 16, the bag holder 19, and the flange 17c of the inflator 17, and fastening nuts (not illustrated) to the bolts protruding from the flange 17c.

The bag holder 19 is made of sheet metal, and holds the airbag 16, the inflator 17, and the pad 22 as illustrated in FIGS. 2 and 4. The bag holder 19 is a member that attaches the airbag device 15 to the steering wheel body 7 using a horn switch unit (not illustrated).

As illustrated in FIGS. 1 to 4, the pad 22 is disposed on an upper face of the boss portion 4 in the steering wheel 1. In the embodiment, the pad 22 includes a pad body 23 and a light source unit 55 disposed on a back face of a ceiling wall portion 26 described later in the pad body 23.

Figure 6:
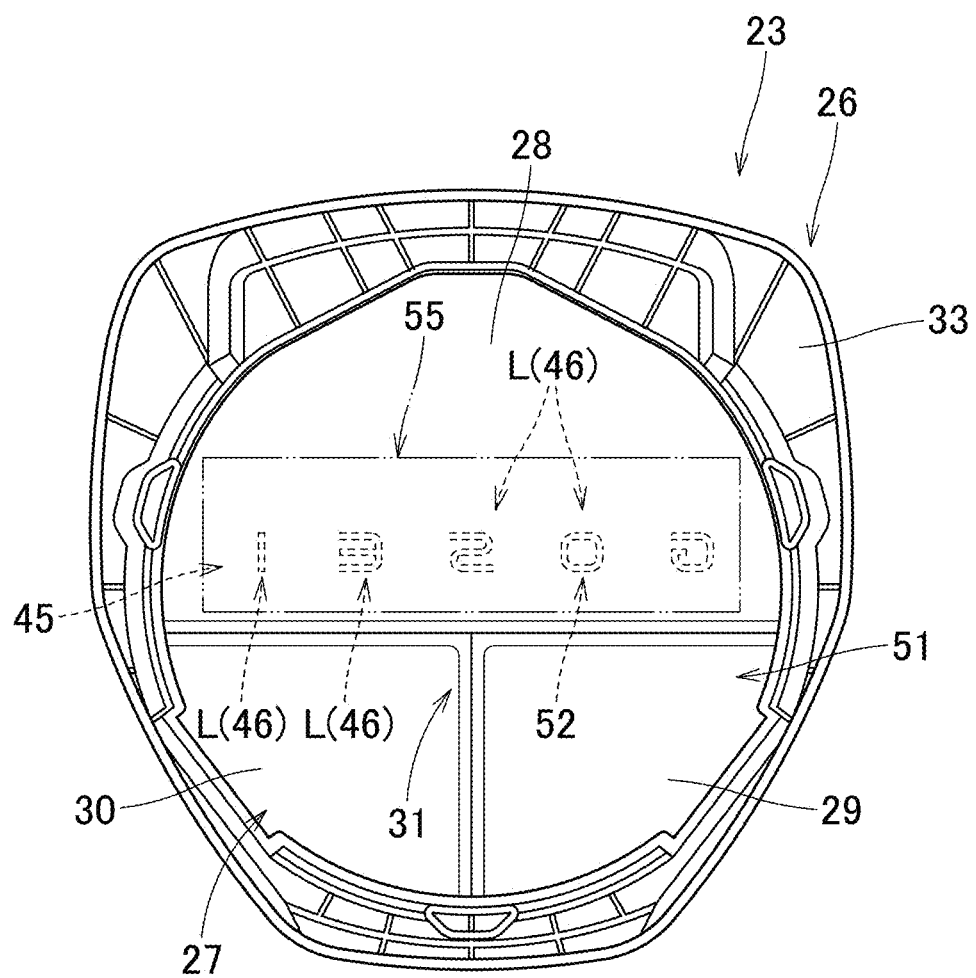
FIG. 6 is a schematic bottom view of a pad body in the steering wheel according to the embodiment.

The pad body 23 is made of a soft synthetic resin, and is made of a polyolefin-based thermoplastic elastomer (TPO) in the embodiment. More specifically, the pad body 23 is made using TPO colored in a white turbid color so as to have translucency as a base material. As illustrated in FIGS. 2, 4, and 6, the pad body 23 includes the ceiling wall portion 26 and a side wall portion 25 extending in a cylindrical shape from the lower face of the ceiling wall portion 26. The ceiling wall portion 26 covers the upper side of the airbag 16 folded and stored inside the boss portion 4. The side wall portion 25 covers the front, rear, left, and right sides of the folded airbag 16.

The ceiling wall portion 26 includes a door disposition portion 27 configured from an inside region of the side wall portion 25, and a peripheral edge portion 33 configured from an outside region of the side wall portion 25. In the region of the door disposition portion 27, a front door portion 28 that opens forward when opened, and a rear left door portion 29 and a rear right door portion 30 that open toward the rear left and the rear right when opened are disposed (see FIGS. 2, 4, and 6). The front door portion 28 includes a region of about the front half area of the door disposition portion 27. The outer shape of the front door portion 28 viewed from above is a semicircular shape. The rear left door portion 29 and the rear right door portion 30 are configured such that a region of about the rear half area of the door disposition portion 27. These rear left door portion 29 and the rear right door portion 30 are divided that rear half area into two on the left and right. The outer shape of each of the rear left door portion 29 and the rear right door portion 30 when viewed from above is ¼ circular. A breakable portion 31 that can be broken when the airbag 16 is inflated is disposed at the periphery of the front door portion 28, the rear left door portion 29, and the rear right door portion 30 (see FIGS. 1, 3, and 6). In the embodiment, the breakable portion 31 is formed by notching the ceiling wall portion 26 from the back face side, and specifically, is configured by continuously disposing notches having a V-shaped cross section (see FIGS. 4 and 5).

On the surface (upper face) of the ceiling wall portion 26, a coating film 36 is formed by applying a coating material having no translucency over the entire surface (except for an opening 46 to be described later) (see FIGS. 4 and 5). In the embodiment, specifically, the black coating material such as an acrylic coating material or an urethane-based coating material is used as a coating material. The coating film 36 formed by applying this coating material does not have translucency. That is, the ceiling wall portion 26 is configured by stacking a translucent layer 40 including a base portion 35 made of the base material itself in a white turbid color and a black non-translucent layer 41 (coating film 36) disposed on the surface of the translucent layer 40 (base portion 35).

Figure 3:
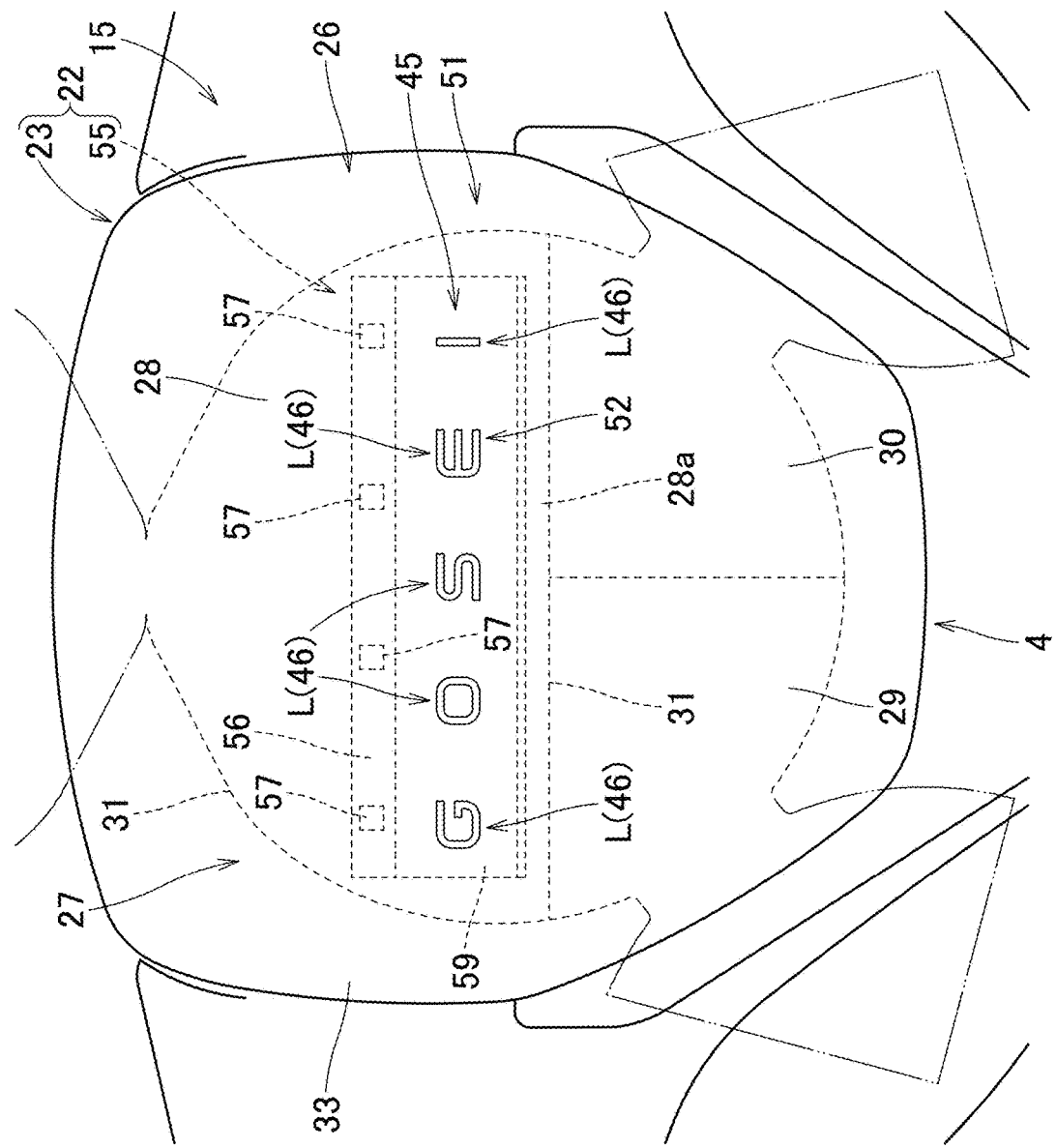
FIG. 3 is a partially enlarged plan view illustrating a region near a pad in the steering wheel according to the embodiment.

A design portion 45 is disposed in the front door portion 28 of the ceiling wall portion 26. In the embodiment, specifically, as illustrated in FIG. 3, the design portion 45 is formed of a plurality of alphabetical letters L (specifically, letters "GOSEI") disposed side by side on the left-right direction in the vicinity of a rear edge 28a of the front door portion 28. Specifically, the front door portion 28 of the embodiment has the opening 46 formed by cutting out the non-translucent layer 41 into the shape of each alphabetical letter L, and a portion (opening 46) formed by cutting out the non-translucent layer 41 constitutes the design portion 45. In the embodiment, the opening 46 is formed by having the coating film 36 except for the portion of each alphabetical letter L. Specifically, the design portion 45 is widely disposed on the left and right so as to extend over the entire left and right regions in the vicinity of the rear edge 28a of the front door portion 28. In the embodiment, a transparent layer 48 is formed inside the opening 46 so as to fill the opening 46 and make the surface flush with the surface of the non-translucent layer 41 (so as to have the same thickness as the coating film 36) (see FIGS. 4 and 5). The transparent layer 48 is formed by applying a colorless transparent coating material such as an acrylic coating material or a urethane-based coating material. As illustrated in FIGS. 4 and 5, a coating layer 49 is formed over the entire surface (including the region of the opening 46) of the ceiling wall portion 26 (the surface of the non-translucent layer 41). The coating layer 49 is disposed to protect the surface of the pad 22 (ceiling wall portion 26). The coating layer 49 is made of a colorless and transparent coating agent such as an acrylic coating agent or a urethane-based coating agent.

In the pad 22 of the embodiment, in the ceiling wall portion 26, the region where the non-translucent layer 41 is disposed does not have the translucency, and only the region of the opening 46 has the translucency. That is, the ceiling wall portion 26 includes a low translucent portion 51 (the disposition region of the non-translucent layer 41) and a high translucent portion 52 (the opening 46 (the transparent layer 48) and the translucent layer 40 (the base portion 35)) having different light transmittances. Instead of the transparent layer, a plating color layer capable of coloring a metal color and having translucency may be disposed in the opening 46. Specifically, in the pad 22 of the embodiment, the light transmittance of the low translucent portion 51 is set to 0%, and the light transmittance of the high translucent portion 52 is set to about 1 to 99% (desirably about 1 to 10%).

Figure 5:
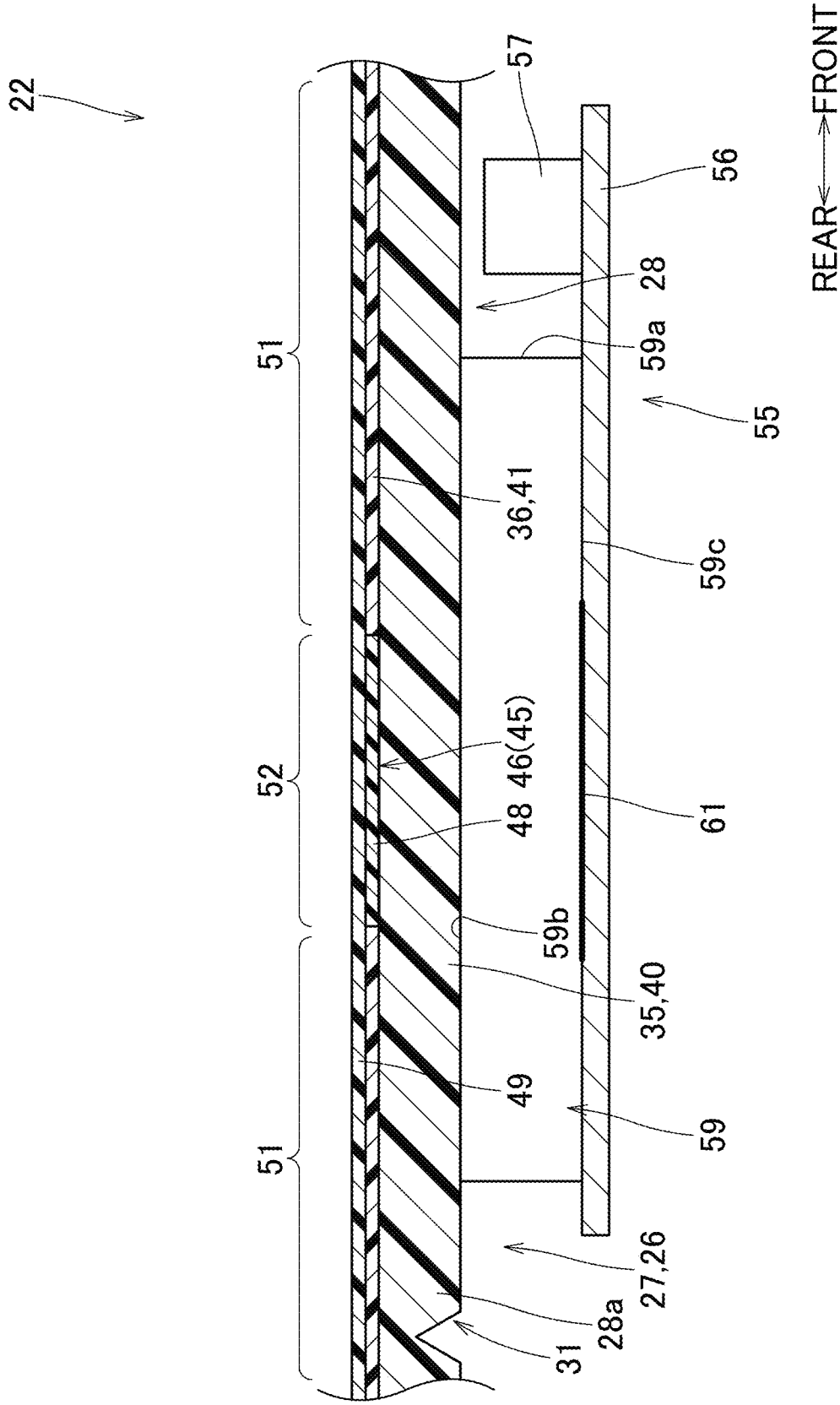
FIG. 5 is a partially enlarged cross-sectional view along the front-rear direction illustrating a portion of the light source unit in the pad.

The light source unit 55 is disposed on the back face of the ceiling wall portion 26, and specifically, is disposed on the back face of the disposition region of the design portion 45, that is, on the back face of the region of the front door portion 28 on the rear side (see FIGS. 4 and 5). The light source unit 55 includes a substrate 56, a visible light source (visible light LED 57) attached to the substrate 56, and a light guide 59.

Figure 7:
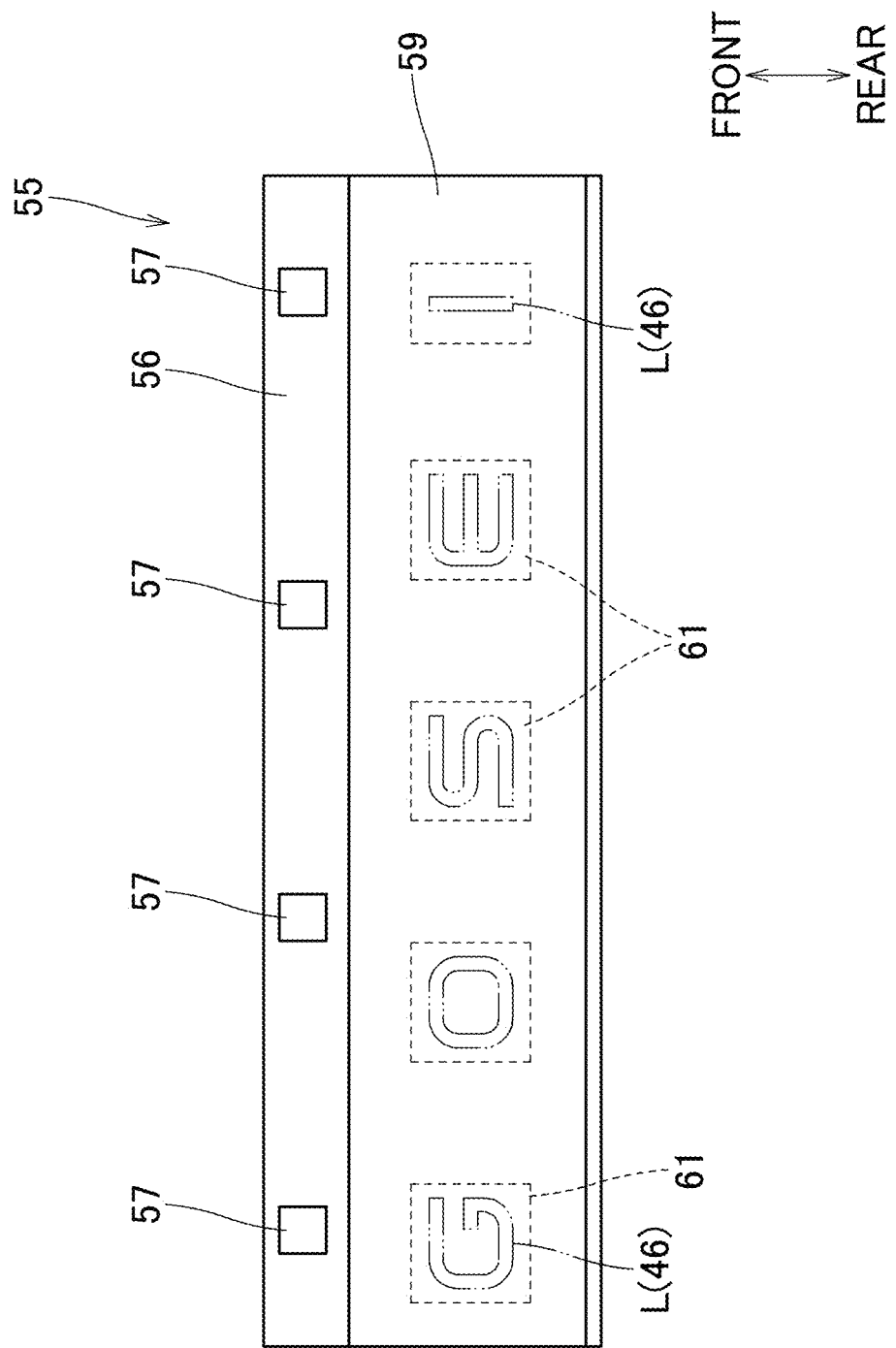
FIG. 7 is a schematic plan view of a light source unit used for the pad of the embodiment.

The substrate 56 is disposed on the lower side which is the airbag 16 side in the light source unit 55. In the embodiment, the outer shape of the substrate 56 is set to be larger than that of the light guide 59, and the substrate has a rectangular plate shape covering the entire lower side of the light guide 59. Specifically, the substrate 56 has a rectangular shape that is wide to the left and right. In the case of the embodiment, a visible light source (visible light LED 57) is attached to the upper face of the substrate 56 on the front end side (see FIG. 5). In the case of the embodiment, four visible light sources (visible light LEDs 57) are disposed side by side along the left-right direction as illustrated in FIGS. 3 and 7.

Figure 8:
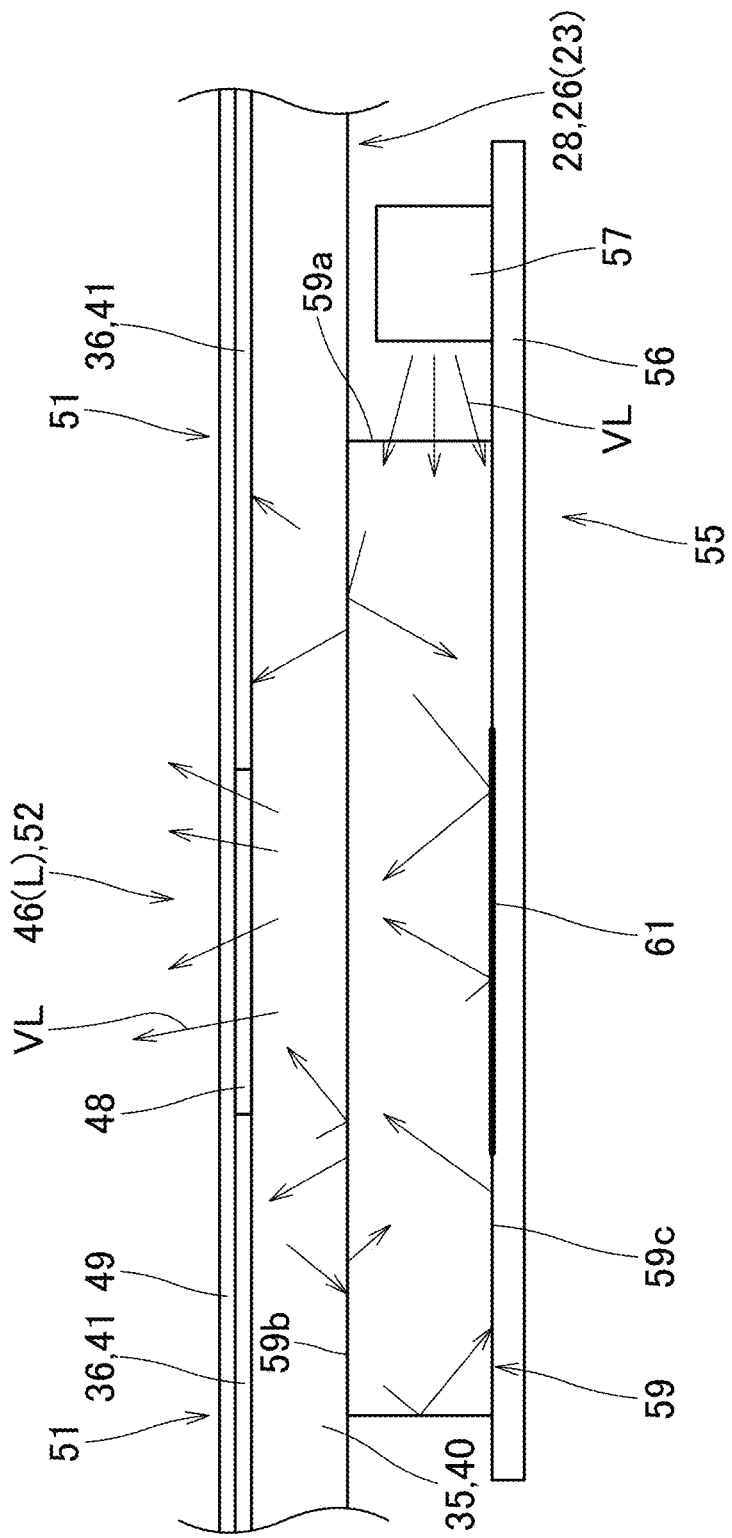
FIG. 8 is a diagram for describing a state of diffusion of visible light by a light guide in the steering wheel according to the embodiment.

As a visible light source that emits visible light when turned on, the visible light LED 57 is used. In the case of the embodiment, as the visible light LED 57, a full color LED (so-called three-color LED) capable of changing the color by sealing a light source capable of emitting red light, green light, and blue light in one package and changing the brightness of each light source is used. The visible light LED 57 is disposed at the side of the light guide 59. In the embodiment, the visible light LED 57 is disposed in front of the rectangular light guide 59 in the long side direction as described later. Specifically, as described above, a plurality of (4 in the case of the embodiment) visible light LEDs 57 is disposed side by side along the long side (that is, in the left-right direction) of the light guide 59 in front of the light guide 59. Each visible light LED 57 is attached to the substrate 56 so as to be able to emit visible light VL rearward, which is the light guide 59 side (see FIGS. 5 and 8). The visible light LED 57 is electrically connected to an operation circuit (not illustrated), and can be turned on so as to emit visible light VL of a predetermined color in response to an operation signal from the operation circuit (not illustrated).

The light guide 59 is disposed at a position immediately below the disposition region of the design portion 45 (that is, the opening 46). The light guide 59 has an outer shape of a rectangular shape (in the case of the embodiment, a rectangular shape having a wide width on the left-right direction) that covers the entire lower side of the design portion 45 and is wider than the design portion 45 in the front-rear and left-right directions (see FIGS. 3 and 7). The light guide 59 is configured such that the visible light VL emitted from the visible light LED 57 disposed in front is incident on the incident face 59a that is a front end face, diffused while being deflected (guided while being refracted) inside, and widely emitted from the upper face 59b (see FIG. 8). The light guide 59 is made of a synthetic resin such as a polycarbonate resin or an acrylic resin. Furthermore, in the case of the embodiment, a reflection layer 61 is provided on the lower face 59c of the light guide 59 (between the light guide 59 and the substrate 56) (see FIG. 5). The reflection layer 61 is disposed to deflect upward the visible light VL incident on the light guide 59. In the embodiment, the reflection layer 61 is formed by partially applying a white coating material to the lower face 59c of the light guide 59. Specifically, on the lower face 59c of the light guide 59, the reflection layer 61 is partially formed at five locations immediately below the respective alphabetical letters L (the respective openings 46) forming the design portion 45 (see FIG. 7).

The light source unit 55 is attached to the back face of the front door portion 28 such that the entire upper face 59b of the light guide 59 is in contact with the lower face (back face) of the ceiling wall portion 26 (front door portion 28) (see FIGS. 4 and 5). In addition, the light source unit 55 (specifically, the substrate 56) is disposed in the region of the front door portion 28 in a state of being viewed in the up-down direction. That is, the light source unit 55 (substrate 56) is disposed at a position not overlapping with the breakable portion 31 formed in the ceiling wall portion 26 in the up-down direction. In other words, the breakable portion 31 is formed so as to bypass the light source unit 55. In the case of the embodiment, when the visible light LED 57 is turned on, the visible light VL emitted from the upper face 59b of the light guide 59 is further diffused in the base portion 35 (translucent layer 40) of the ceiling wall portion 26, and in a state of being diffused in the base portion 35 (translucent layer 40), the visible light VL is emitted to the outside through the opening 46 (transparent layer 48) (see FIG. 8). That is, in the pad 22 of the embodiment, when the visible light LED 57 is turned on, the visible light VL is diffused while being deflected inside the light guide 59 and the base portion 35 (translucent layer 40). In a state where steering wheel 1 is viewed from above, as illustrated in FIG. 9, the plurality of alphabetical letters L (letters "GOSEI", that is, the design portion 45) constituting the opening 46 is uniformly illuminated as a whole (in FIG. 9, the glowing state is displayed in a shaded manner) with unevenness in brightness being suppressed.

The pad 22 of the embodiment can be manufactured as follows. First, a resin portion is formed by injection molding or the like. After the formation of the resin portion, a black coating material is applied to the surface of the ceiling wall portion 26 (specifically, the base portion 35) to form the non-translucent layer 41 (and the opening 46). Next, the transparent layer 48 is formed in the region of the opening 46. Thereafter, when the coating agent is applied to the entire surface including the region of the opening 46 on the surface of the ceiling wall portion 26 (non-translucent layer 41) to form the coating layer 49, the pad body 23 having the design portion 45 can be formed. Thereafter, the pad 22 can be manufactured by attaching the light source unit 55 to the back face of the design portion 45 in the ceiling wall portion 26 (the back face of the front door portion 28 in the rear edge 28a side region).

The distal end of the side wall portion 25 is attached to the bag holder 19 in a state where the folded airbag 16 and the inflator 17 are attached such that the pad 22 thus manufactured covers the periphery of the folded airbag 16. In this manner, the airbag device 15 can be assembled. Thereafter, the airbag device 15 is attached to the steering wheel body 7 in a state of being attached to the vehicle body using a horn switch unit (not illustrated). When a lead wire (not illustrated) extending from the inflator 17 and a lead wire (not illustrated) extending from the light source unit 55 are connected to a predetermined operation circuit, the airbag device 15 can be assembled to the steering wheel body 7, and the steering wheel 1 can be mounted on the vehicle.

In the pad 22 of the embodiment, the ceiling wall portion 26 of the pad body 23 includes the low translucent portion 51 and the high translucent portion 52 having different light transmittances, and the high translucent portion 52 is configured to transmit light (visible light VL) emitted from the light source unit 55 disposed on the back face of the ceiling wall portion 26. The high translucent portion 52 constitutes the design portion 45 disposed in the region of the ceiling wall portion 26. That is, in the pad 22 of the embodiment, part of the ceiling wall portion 26 is the high translucent portion 52 (design portion 45) instead of a configuration in which a separate member is attached for decoration, and the design portion 45 including the high translucent portion 52 can be illuminated at a predetermined time. Thus, an increase in the number of parts can be suppressed, and the weight can be reduced.

Therefore, in the pad 22 of the embodiment, even when the designability is good, an increase in the number of parts can be suppressed, and weight reduction and cost reduction can be realized.

Specifically, in the pad 22 of the embodiment, the ceiling wall portion 26 is configured by stacking the translucent layer 40 and the non-translucent layer 41 disposed on the surface of the translucent layer 40, and includes the opening 46 formed by cutting out the non-translucent layer 41. The opening 46 and the translucent layer 40 constitute the high translucent portion 52. That is, in the pad 22 of the embodiment, the high translucent portion 52 (that is, the design portion 45) can be formed only by forming the opening 46 by simply cutting out the non-translucent layer 41 stacked on the surface of the translucent layer 40. Therefore, a simple configuration can be obtained, and manufacturing is facilitated. In addition, at the time of irradiation by the light source unit 55, the visible light VL emitted from the light source unit 55 can be emitted from the opening 46 so as to be diffused in the translucent layer 40, and thus, the opening 46 (that is, the design portion 45) can be uniformly illuminated. When such a point is not taken into consideration, the ceiling wall portion may be made of a non-translucent material (for example, black TPO or the like), and an opening may be provided at a predetermined position of the ceiling wall portion by cutting out the ceiling wall portion itself.

In the pad 22 of the embodiment, the pad body 23 is made of a base material having translucency, and the non-translucent layer 41 is formed in a thin film shape so as to cover the surface of the ceiling wall portion 26. That is, in the pad 22 of the embodiment, the translucent layer 40 is composed of the pad body 23 itself (the base portion 35 of the ceiling wall portion 26), so that a simpler configuration can be obtained.

Furthermore, in the pad 22 of the embodiment, the base material (base portion 35) is colored in a white turbid color. Therefore, for example, when the base material (base portion 35, that is, translucent layer 40) is configured to be visually recognizable from the opening 46, it is difficult to visually recognize the region below the base portion 35, that is, the parts and the like (in the case of the embodiment, the folded airbag 16 and the like) stored in the boss portion 4, and the designability can be further improved.

Furthermore, in the pad 22 of the embodiment, the entire surface of the ceiling wall portion 26 is covered with the coating layer 49. Therefore, a step is less likely to occur on the peripheral edge of the opening 46, the design can be further improved, and the tactile sensation at the time of use can also be improved. Specifically, in the pad 22 of the embodiment, by disposing the transparent layer 48 in the opening 46, a step is further less likely to occur between the opening 46 and the surrounding non-translucent layer 41, and the tactile sensation at the time of use can be further improved. When such a point is not taken into consideration, a transparent layer or the like need not be disposed in the opening, and a coating layer need not be disposed.

Furthermore, in the pad 22 of the embodiment, the light source unit 55 includes the substrate 56, the visible light LED 57 (visible light source) that is attached to the substrate 56 and emits visible light during lighting, and the light guide 59 that diffuses the visible light VL emitted from the visible light LED 57 while deflecting the visible light VL. The light guide 59 is disposed so as to entirely cover a region below the opening 46, and the visible light LED 57 is disposed on a side of the light guide 59. Therefore, when the visible light LED 57 is turned on, the visible light VL emitted from the visible light LED 57 is incident on the side of the light guide 59 and is emitted from the opening 46 (design portion 45) disposed above the light guide 59. As a result, the visible light VL can be emitted from the opening 46 in a state of being diffused while being sufficiently deflected in the light guide 59. The light guide 59 is disposed so as to entirely cover a region below the opening 46. As a result, when the visible light LED 57 is turned on, the occurrence of unevenness can be suppressed, the entire opening 46 (design portion 45) can be uniformly illuminated, and the designability can be further improved. Further, in the pad 22 of the embodiment, the visible light LED 57 is disposed at the side of the light guide 59. Therefore, it is also possible to suppress bulkiness of the light source unit 55. When such a point is not taken into consideration, the visible light LED (visible light source) may be disposed not at the side of the light guide but in a lower region. In addition, the light guide need not be configured to entirely cover the region below the opening.

Specifically, in the pad 22 of the embodiment, the light source unit 55 is attached to the back face of the front door portion 28 such that the upper face 59b of the light guide 59 is in contact with the entire lower face (back face) of the ceiling wall portion 26 (front door portion 28). The base portion 35 of the ceiling wall portion 26 is made of a base material having translucency. Therefore, when the visible light LED 57 is turned on, the visible light VL emitted from the upper face 59b of the light guide 59 is further diffused in the base portion 35 (translucent layer 40) of the ceiling wall portion 26, and is emitted to the outside through the opening 46 (transparent layer 48) in a state of being diffused in the base portion 35 (translucent layer 40). Furthermore, since the base portion 35 is colored in a white turbid color, it has good light diffusion performance. Therefore, as compared with the case where the base portion is made of a transparent material, the visible light VL entering the inside can be further diffused by the base portion 35 in a white turbid color. That is, in the pad 22 of the embodiment, the visible light VL emitted from the light guide 59 can be further diffused by the pad body 23 itself (strictly speaking, the base portion 35 itself constituting the ceiling wall portion 26). Therefore, the generation of the brightness difference can be suppressed, and the entire opening 46 (design portion 45) can be stably and uniformly illuminated without unevenness. Further, in the pad 22 according to the embodiment, a plurality of visible light LEDs 57 (visible light sources) is disposed side by side along the longitudinal direction (left-right direction) in the short direction (in the case of the embodiment, the front side) of the rectangular light guide 59. Therefore, even when the light guide 59 has a rectangular shape wide to the left and right, the visible light VL can be diffused inside so as to uniformly illuminate the entire light guide 59. As a result, the design portion 45 disposed to be wide on the left and right can be uniformly illuminated over the entire region.

Furthermore, the pad 22 the of embodiment is configured to cover the airbag 16 folded and stored inside the boss portion 4, and the breakable portion 31 formed on the ceiling wall portion 26 is formed so as to bypass the light source unit 55. Therefore, even with the configuration in which the airbag 16 is housed inside and the light source unit 55 is disposed on the back face of the ceiling wall portion 26, the door portion (front door portion 28, rear left door portion 29, rear right door portion 30) can be smoothly opened while the breakable portion 31 is ruptured in the initial stage of inflation of the airbag 16, and the airbag 16 can be rapidly inflated. In the embodiment, the pad as the airbag cover is taken as an example, but the pad to which the present invention can be applied is not limited to the embodiment, and the present invention can also be applied to a pad of a steering wheel (steering device) having a configuration not including an airbag.

The present disclosure relates to a steering device pad having the following configuration.

A steering device pad that is disposed on an upper face of a boss portion in a steering device and in which a design portion is disposed in a region of a ceiling wall portion covering the boss portion,
  the steering device pad includes
  a pad body, and
  a light source unit disposed on a back face of the ceiling wall portion of the pad body and configured to irradiate the design portion, wherein
  the ceiling wall portion includes a low translucent portion and a high translucent portion having different light transmittances, and wherein
  the high translucent portion constitutes the design portion so as to be configured to transmit light emitted from the light source unit.

In the steering device pad of the present disclosure, the ceiling wall portion of the pad body includes the low translucent portion and the high translucent portion having different light transmittances, and the high translucent portion is configured to transmit light emitted from the light source unit disposed on the back face of the ceiling wall portion. The high translucent portion constitutes a design portion disposed in a region of the ceiling wall portion. That is, in the steering device pad of the present disclosure, part of the ceiling wall portion is a high translucent portion (design portion), and a separate member is not attached for decoration. Then, the design portion including the high translucent portion can be illuminated at a predetermined time. Thus, an increase in the number of parts can be suppressed, and the weight can be reduced.

Therefore, in the steering device pad of the present disclosure, it is possible to suppress an increase in the number of parts and to realize weight reduction and cost reduction even while the design is good.

Specifically, in the steering device pad according to the present disclosure, it is preferable that the ceiling wall portion is formed by stacking a translucent layer and a non-translucent layer disposed on a surface of the translucent layer, and includes an opening formed by cutting out the non-translucent layer, and
  the opening and the translucent layer constitute a high translucent portion.

With such a configuration of the steering device pad, the high translucent portion (that is, the design portion) can be formed only by forming the opening by simply cutting out the non-translucent layer stacked on the surface of the translucent layer. Therefore, a simple configuration can be obtained, and manufacturing is facilitated. In addition, at the time of irradiation by the light source unit, visible light emitted from the light source unit can be emitted from the opening so as to be diffused in the translucent layer. Therefore, the opening (that is, the design portion) can be uniformly illuminated.

Further, in the steering device pad having the above configuration, it is preferable that the pad body is made of a base material having translucency, and the non-translucent layer is formed in a thin film shape so as to cover the surface of the ceiling wall portion. With such a configuration, the translucent layer is composed of the pad body itself, and a simpler configuration can be obtained.

Further, in the steering device pad having the above configuration, it is preferable that the base material is colored in a white turbid color. With such a configuration, for example, when the base material (translucent layer) is configured to be visually recognizable from the opening, it is difficult to visually recognize the region below the base material, that is, the parts and the like housed in the boss portion, and the designability can be further improved.

Furthermore, in the steering device pad having the above configuration, it is preferable that the entire surface of the ceiling wall portion is covered with a coating layer. With such a configuration, a step is less likely to occur on the peripheral edge of the opening, the design property can be further improved, and the tactile sensation at the time of use can also be improved.

Furthermore, in the steering device pad having the above configuration, it is preferable that the light source unit includes a substrate, a visible light source that is attached to the substrate and emits visible light during lighting, and a light guide that diffuses the visible light emitted from the visible light source while deflecting the visible light,
  the light guide is disposed so as to entirely cover a region below the opening, and
  the visible light source is disposed at a side of the light guide.

With such a configuration of the steering device pad, when the visible light source is turned on, the visible light emitted from the visible light source is incident on the side of the light guide and is emitted from the opening (design portion) disposed above the light guide, so that the visible light can be emitted from the opening in a state of being diffused while being sufficiently deflected in the light guide. The light guide is disposed so as to entirely cover a region below the opening. Therefore, when the visible light source is turned on, the occurrence of unevenness can be suppressed, the entire opening (design portion) can be uniformly illuminated, and the design property can be further improved. Further, in the steering device pad having the above configuration, since the visible light source is disposed at the side of the light guide, it is also possible to suppress bulkiness of the light source unit.

Furthermore, in the steering device pad having the above configuration, it is preferable that the folded airbag is stored in the boss portion,
  the ceiling wall portion is configured such that a plurality of door portions is opened by breaking a breakable portion disposed at a predetermined position when the airbag is inflated, and
  the breakable portion is formed so as to bypass the light source unit.

With such a configuration of the steering device pad, even in a configuration in which the airbag is housed inside and the light source unit is disposed on the back face of the ceiling wall portion, the door portion can be smoothly opened while the breakable portion is broken in the initial stage of inflation of the airbag, and the airbag can be rapidly inflated.

What is claimed is:

1. A steering device pad that is disposed on an upper face of a boss portion in a steering device and in which a design portion is disposed in a region of a ceiling wall portion covering the boss portion, the steering device pad comprises:
- a pad body; and
- a light source unit disposed on a back face of the ceiling wall portion and configured to irradiate the design portion, wherein the ceiling wall portion includes a low translucent portion and a high translucent portion having different light transmittances, and wherein the high translucent portion constitutes the design portion so as to be configured to transmit light emitted from the light source unit.

2. The steering device pad according to claim 1, wherein the ceiling wall portion is formed by stacking a translucent layer and a non-translucent layer disposed on a surface of the translucent layer, and includes an opening formed by cutting out the non-translucent layer, and wherein the opening and the translucent layer constitute the high translucent portion.

3. The steering device pad according to claim 2, wherein the pad body is made of a base material having translucency, and wherein the non-translucent layer is formed in a thin film shape so as to cover a surface of the ceiling wall portion.

4. The steering device pad according to claim 3, wherein the base material is colored in a white turbid color.

5. The steering device pad according to claim 2, wherein the ceiling wall portion is entirely covered with a coating layer on a surface side.

6. The steering device pad according to claim 1, wherein the light source unit includes a substrate, a visible light source attached to the substrate and configured to emit visible light during lighting, and a light guide configured to diffuse the visible light emitted from the visible light source while deflecting the visible light, wherein the light guide is disposed so as to entirely cover a region below an opening in the ceiling wall portion, and wherein the visible light source is disposed at a side of the light guide.

7. The steering device pad according to claim 6, wherein a folded airbag is stored in the boss portion, wherein the ceiling wall portion is configured such that a plurality of door portions is opened by breaking a breakable portion disposed at a predetermined position when the airbag is inflated, and wherein the breakable portion is formed to bypass the light source unit.

* * * * *